United States Patent Office 3,499,237
Patented Mar. 10, 1970

3,499,237
COATING FOR STEAM IRON FLASH BOILER
Glenn T. Piper, North Canton, Ohio, assignor to The Hoover Company, North Canton, Ohio, a corporation of Delaware
Filed May 23, 1966, Ser. No. 552,237
Int. Cl. D06f 75/20
U.S. Cl. 38—77.83                                    7 Claims

ABSTRACT OF THE DISCLOSURE

A coating is provided for the flash boiler in the soleplate of a steam iron to prevent a phenomena referred to in the art as "spitting," whereby water is driven out of the flash boiler as liquid globules entrained in the steam. Spitting is most prevalent at higher iron temperatures and results in staining the fabrics being ironed. The coating consists of an at least partially soluble alkali metal silicate and powdered glass in water. While sodium silicate is preferred, for cost reasons, potassium, lithium or other metal silicates can be used. Also for cost reasons, the powdered glass is preferably a soda lime type. Although relative amounts of silicon dioxide to sodium oxide, comprising the alkali metal silicate, can vary, the ratio by weight, which has been found to be the most effective is approximately 3.75 to 1, respectively. The glass particles should pass through a 100 mesh screen. An example of a preferred coating would include a sodium silicate solution diluted with an equal amount of distilled or de-ionized water of a specific gravity of 1.157 at 80° F. The ratio by weight of powdered glass to diluted sodium silicate solution, while not being critical, preferably is, by weight, 1 part of powdered glass to 3 parts of the diluted sodium silicate solution. The coating is applied to the surface of the flash boiler in an iron soleplate by a brush or any other convenient method. The water is then removed from the coating composition by heating which tends to cause the alkali metal silicate to etch the powdered glass particles until the concentration of the silicon dioxide in the alkali metal silicate is increased until the composition is substantially insoluble. The final coating has a roughened surface, to break up the water globules, resulting from the remaining powdered glass bonded to the surface of the flash boiler by the water insoluble alkali metal silicate. The alkali metal silicate, being hydrophilic, also tends to cause the water drops to flatten out and expand across the surface of the coating.

---

The present invention relates to coatings for the flash boiler of a household type steam iron which reduces the "spitting" of water from the steam ports.

In steam irons of the flash boiler type, the water is fed drop by drop onto a hot area on the soleplate, usually depressed below the top surface of the soleplate. The hot surface is covered by a plate attached to the soleplate and the cavity formed between the soleplate and the cover forms what is known as the flash boiler chamber. If no means is provided to prevent it, the drops of water will bounce about on the heated surface of the soleplate without being converted substantially instantaneously into steam. These water globules may be ejected or spit out of the flash boiler chamber through the steam passageways and onto the material being ironed which can stain the material being ironed.

In the past, the flash boiler has been coated with a hydrophilic material such as sodium silicate to provide a wettable surface and which causes the incoming drops of water to spread over the surface. Experience has shown that a heavy coating of sodium silicate is required because the material tends to wash out with use. If a single heavy application is made, the sodium silicate will froth as the water is baked out and this type coating will flake and can be washed out easily during steaming. The application of several thin coats with the application of heat between coats has been proposed as a solution to the problem but the process becomes time consuming and costly.

Also it has been suggested that a rough surface on the flash boiler tends to reduce spitting by breaking up the small droplets of water which can be ejected from the flash boiler without being converted into steam. This approach has not been the complete answer and it is not common practice to rely solely on this approach.

Another approach is to coat the flash boiler with a low thermal conductive material such as mica which slows down the generation of steam under each drop as it falls on the flash boiler surface. This approach has had its drawbacks in that it is difficult and costly to produce an adherent coating by this method.

An object of the present invention is to provide an improved steam iron of the type having a flash boiler in the soleplate wherein the possibilities of droplets of water being emitted from the steam ports in the soleplate to the article being ironed are eliminated.

It is an additional object of the invention to provide a steam iron of the type described wherein the upper temperature limit of the soleplate at which "spitting" occurs is substantially increased. This permits faster steam ironing of those materials which can withstand higher temperatures. An example of one of these materials is linen.

A further object of the invention is to reduce the possibilities of water droplets being ejected from the steam ports when the iron is moved to the vertical position on the heel rest. A further object of the invention is to provide a steam iron flash boiler treatment which is durable, does not wash out and which is simple to apply to the flash boiler areas.

The above objects are attained by treating the flash boiler surface with a water mixture of an alkali metal silicate, such as sodium silicate, and powdered glass after which the excess water is baked out to form a tightly adherent film which is not water soluble and which I have found significantly reduces the spitting characteristics. This new coating also permits the use of a wider steaming temperature range by increasing the upper temperature limit at which "spitting" occurs. The coating of my invention also can be conveniently and economically applied.

These and other objects and advantages are more fully set forth in the accompanying specification and drawing in which.

Figure 1:
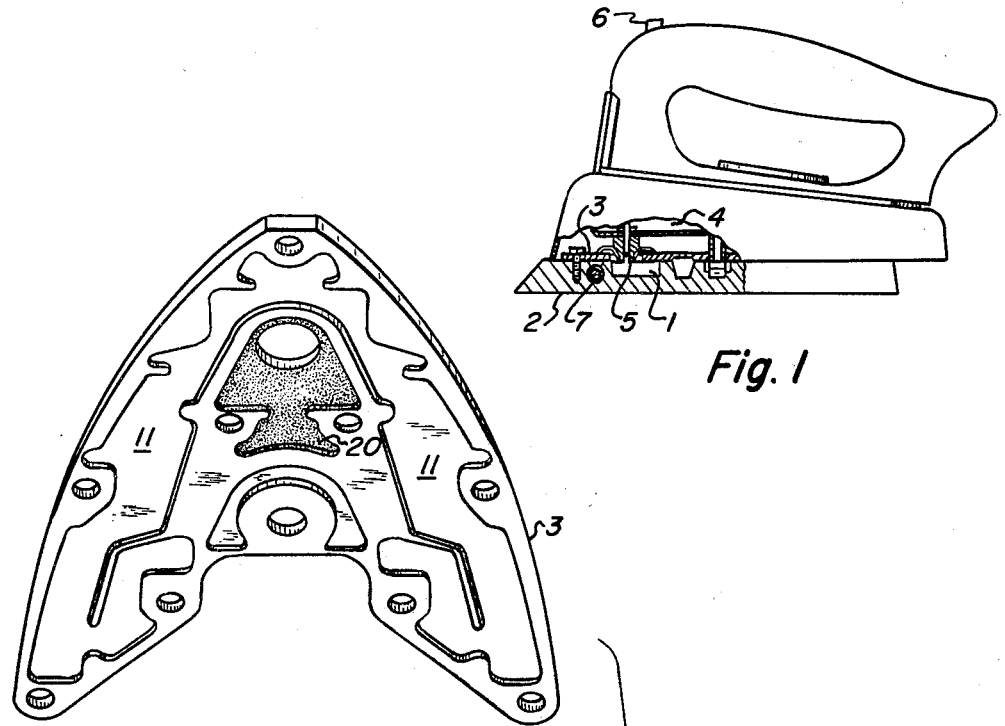
FIGURE 1 is a view of a steam iron having a section of the cover broken away to show the water reservoir, water valve and flash boiler chamber.

The invention is shown applied to a conventional steam iron having a flash boiler indicated generally at 1 formed by a recess in the soleplate 2. The flash boiler is closed by a cover 3 which is attached to the soleplate. Immediately above the soleplate, a water reservoir 4 is positioned and is connected to the flash boiler 1 by a valve 5. A control button 6 located at the uppermost front portion of the handle allows the user to set the valve 5 to a closed or open position. The soleplate is heated by heating element 7 which is embedded in the soleplate 2.

When the control button 6 is moved to open position, the valve 5 is opened to permit water to drip from the end of the valve 5 onto the heated surface of the flash boiler chamber 1. The water droplets are then converted into steam which flows rearwardly through the steam passageway 10 formed in the soleplate and then upwardly into a steam passageway 11 formed in the soleplate cover 3. The passageway 11 extends along both sides of the iron and also rearwardly of the flash boiler. The passageway 11 is connected to the steam outlet ports 12 which conduct the steam to the material being ironed.

Figure 2:
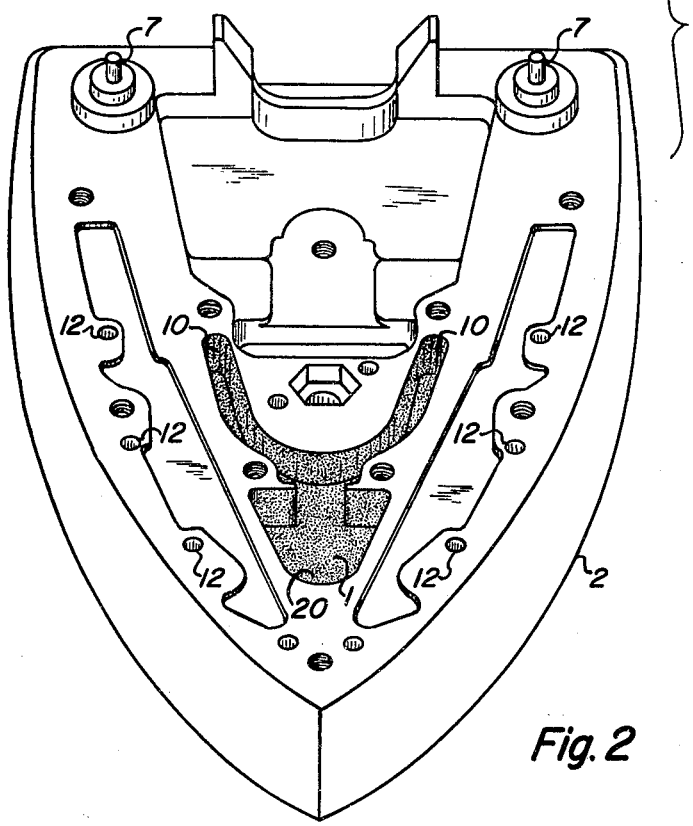
FIGURE 2 is an exploded perspective view of the top of the soleplate with the soleplate cover removed so as to show also the underside of said soleplate cover.

The surface coating or treatment which is applied to the flash boiler 1 and the steam passage 10 is shown stippled as it appears in FIGURE 2 and is denoted by the reference character 20.

FORMULATION OF COATING SOLUTION

The formulation of the surface coating 20 involves an alkali metal silicate, powdered glass and water. For the purposes of my invention any alkali metal silicate that is soluble in water can be used, examples of which are lithium, potassium and sodium silicates. The sodium and potassium silicates are readily available while for practical purposes the sodium silicates are less costly.

Specifically, I have chosen to describe the sodium silicates which are available in various proportions of sodium oxide, silica and water. It is common to describe these sodium silicates by the weight ratio of silicon dioxide ($SiO_2$) to sodium oxide ($Na_2O$). For ratios of $SiO_2/Na_2O$ above 4:1, the silicates are not readily water soluble and therefore are not suitable but it is desirable to use a sodium silicate having a $SiO_2/Na_2O$ ratio as close to 4:1 as possible. This is because the dehydrated films in the higher $SiO_2$ ratios approaching 4:1 are appreciably less soluble in water than the lower ratios, and thus are more resistant to erosion during steaming. Specifically, I have found that Philadelphia Quartz Co. "S–35" sodium silicate solution is very effective and it has a $SiO_2/Na_2O$ ratio of 3.75 to 1. This particular sodium silicate is 25.3% silicon dioxide ($SiO_2$), 6.75% sodium oxide ($Na_2O$) and the balance is water.

The sodium silicate solution described is diluted with an equal amount of distilled or de-ionized water. The specific gravity of this solution at 80° F. is 1.157.

The powdered glass preferred, primarily because of cost reasons, is a soda-lime type of glass. The particle size of the glass has been found to be important. If the average size of the particles is too large, the coarse particles settle out very rapidly and the coating is difficult to apply. Likewise I have found that colloidal size silica when mixed with the sodium silicate did not provide the desired adherence of the coating to the soleplate. The effect of particle size will be described later.

The powdered glass is mixed into the diluted sodium silicate solution, and I have found that the ratio of powdered glass to diluted sodium silicate solution is not critical. Generally, I prefer to use about 1 part by weight of powdered glass to 3 parts by weight of the diluted sodium silicate. Tests have shown, however, that the final proportion of sodium silicate to glass after baking out the chemically combined and physically absorbed water can be varied from 15 to 95% sodium silicate and 85–5% powdered glass. My tests have shown that if the composition of the baked treatment exceeds a calculated value of 85% powdered glass the wet coating is so viscous that it cannot be spread conveniently, and any increase in the ratio of glass to sodium silicate is impractical.

On the minimum side the percentage of glass in the baked out coating has been found to be about 5%. This value appears to be the limit below which excess foaming develops during the baking process which results in poor adherence of the coating as evidenced by the coating flaking off the flash boiler during steaming.

It is to be stressed that the liquid coating composition of my invention is not a colloidal suspension and for that reason must be stirred continually to avoid settling of the glass particles. In production magnetic type stirrers are employed.

More importantly, the powdered glass slowly reacts with the sodium silicate and the viscosity of the matrix slowly increases until it becomes a gel-like semi-solid which is not soluble in water. One explanation is that the surface of the glass particles is etched slowly which at the same time disturbs the equilibrium between the silicon dioxide and the sodium oxide and as this reaction takes place the sodium silicate becomes decreasingly less water soluble.

In using the coating in production a small batch, enough for one day's use, is prepared. A new batch is prepared daily because of the reaction of the sodium silicate on the glass particles described previously.

Examples of powdered glass that have been tested are available from The Bassichis Company, Cleveland, Ohio. The grade and sieve classification are listed in the following table:

TABLE I.—SIEVING CLASSIFICATION OF POWDERED GLASS SAMPLES FROM BASSICHIS

| Sieve classification | Bassichis designation (grams) | | |
|---|---|---|---|
| | 111 | 120C | AFW |
| On 60 mesh | None | None | None |
| Through 60 on 80 mesh | 9.9 | None | None |
| Through 80 on 100 mesh | 19.9 | None | None |
| Through 100 on 150 mesh | 41.0 | 4.4 | 0.5 |
| Through 150 on 200 mesh | 20.8 | 36.5 | 25.5 |
| Through 200 on 325 mesh | 4.4 | 39.7 | 45.1 |
| Through 325 mesh | 3.0 | 19.0 | 24.4 |

As described previously, the grade 111, although it showed improved steaming characteristics, the glass particles were so coarse that the particles settled out of the mixture very rapidly. It was also found that the preparation was difficult to apply and the adherence of the coating was inferior to coatings made with the other two grades of powdered glass. As a practical limit on the particle size it was found that the powdered glass should pass through a 100 mesh sieve.

It is important not to have the particle size of the glass particles too small which results in poor adherence of the coating to the soleplate. Also, it becomes difficult to apply a thick enough coating without having frothing develop during the baking out process and if the coating frothes then it will flake off and give poor steaming results. A practical limit on the fineness of the particles is that 70 percent is retained on a 325 mesh sieve.

APPLICATION OF THE COATING

The surfaces of the flash boiler 1 and the steam passageway 10 must be cleaned thoroughly prior to the application of the coating 20. This is done by rinsing in water with a small amount of detergent added to improve the cleaning and the subsequent wetting characteristics of the surfaces when the coating 20 is applied.

The coating 20 comprising a water solution of sodium silicate and powdered glass may be applied to the bottom and side walls of the flash boiler 1 by any suitable method although I have found that a small brush is quite adequate. It is pointed out that the steam passage 10 located in the soleplate is also coated as indicated by the stippled area 20 in FIGURE 2. Also the corresponding mating surfaces of the soleplate cover 3 may be coated. When applied by a brush the single coat is applied as thick as conveniently possible without any large build up in the corners. There is no need however, to repeatedly brush the surface so as to thin out the coating. The dried coating resulting from this method of application is about 1.2 grams per square inch.

Normally, the absorbed water can be removed merely by allowing the water to evaporate at ambient temperature and humidity until the film appears dry, then operating the assembled iron as a dry iron with the thermostat set to a temperature of about 300–350° for a minimum period of approximately two hours. The water can also be removed by heating the soleplate and cover in an oven to 300° F. for about three hours. The application of heat speeds up the reaction of the sodium silicate on the glass particles resulting in a non soluble coating and of course it must be completed before the iron is used as a steam iron, otherwise the coating will tend to wash or dissolve out.

EXAMPLES

Numerous tests were made of the sodium silicate and powdered glass treatments for the flash boiler and first stage passageway of a steam iron. Two characteristics were examined in order to evaluate the effectiveness of the coating. The first was the maximum temperature before spitting occurred and the second was the maximum temperature before spitting occurred after 1000 cc. of de-ionized water had been evaporated in the steam chamber and passageway. This second test was made to check if the treatment had been washed or dissolved away. De-ionized water was used so that there would be no deposits formed on the coating which would mask the results. The appearance of the coating after running through 1000 cc. of de-ionized water was also recorded.

For a control, the experience with using a single coat of sodium silicate only (Philadelphia Quartz S-35) diluted 1 to 1 by volume in de-ionized water is recorded. The other two coatings were made of S-35 sodium silicate diluted 1 to 1 in water and 1 part by weight of powdered glass was mixed into three parts of diluted sodium silicate solution. In one case Bassichis grade 120C powdered glass was used and in the other Bassichis grade AFW was used (see Table I). The results are shown in Table II.

TABLE II

| Test | Max. Temp., ° F., Before Spitting | | Appearance after 1,000 cc. of water evap. |
|---|---|---|---|
| | At Start | After 1,000 cc. of water evap. | |
| S-35 Sodium Silicate (Control). | 380-400 | 350-360 | Coating appeared to be removed. |
| Control with 120C Powdered Glass. | 450-500 | 430-500 | Coating appeared intact with very slight flaking. |
| Control with AFW | 400-470 | 390-450 | Coating appeared intact with slight flaking. |

The results show that the hydrophilic coating consisting of sodium silicate and powdered glass is more permanent and is less soluble than a coating of sodium silicate. The results indicate also that the sodium silicate with 120C grade powdered glass showed some flaking but the flaking had little or no deleterious effect on steaming. With the AFW grade of powdered glass the maximum temperature before spitting was appreciably lower than with 120C grade both at the start and after 1000 cc. of water had been evaporated, but the results were significantly improved over the sodium silicate control.

It is believed that the particles of glass present in the 120C coating or the AFW coating help to break up the steam cushion under the droplets contacting the hot surface and also provide an increased insulating effect which reduces the tendency of a steam cushion to form.

Although several examples of my invention have been shown and described, various adaptations and modifications can be made.

I claim:
1. In a steam iron sole plate having a flash boiler formed therein, an adherent insoluble hydrophilic coating on said flash boiler comprising a matrix of an alkali metal silicate with powdered glass embedded therein.
2. The invention of claim 1 wherein said powdered glass comprises 5 to 85 percent by weight of the coating.
3. The invention of claim 1 wherein the alkali metal silicate is sodium silicate.
4. The invention of claim 3 wherein the sodium silicate is bonded to the glass particles and the sodium silicate is water insoluble.
5. The invention of claim 1 wherein the powdered glass is a soda-lime type glass.
6. The invention of claim 1 wherein said powdered glass consists of particles all of which will pass through a 100 mesh sieve and at least seventy percent will be retained on a 325 mesh sieve.
7. A method for treating the surfaces of flash boilers of steam irons to prevent "spitting" including the following steps:
 (a) formulating a coating composition comprising at least a partially soluble alkali metal silicate and powdered glass in water,
 (b) applying said coating to the surface of a flash boiler of a steam iron,
 (c) subsequent to step (b), heating said coating, to etch said powdered glass and simultaneously remove water from said composition, until said concentration of silicon dioxide of the alkali metal silicate is increased until said composition is substantially insoluble, whereby said coating has a roughened hydrophilic surface caused by the remaining glass bonded to said surface of said flash boiler by said water insoluble, hydrophilic alkali metal silicate.

References Cited

UNITED STATES PATENTS

| 2,683,320 | 7/1954 | Morton | 38—77 |
| 2,967,365 | 1/1961 | Extale et al. | 38—77 |
| 3,101,561 | 8/1963 | Albrecht et al. | 38—77 |
| 3,218,741 | 11/1965 | Martin | 38—77 |

PATRICK D. LAWSON, Primary Examiner